United States Patent
Burgess et al.

[15] 3,666,310
[45] May 30, 1972

[54] SHOCK ABSORBING BUMPER

[72] Inventors: Lester E. Burgess, Swarthmore, Pa.;
Ignatius J. Niemkiewicz, Wilmington, Del.;
Robert W. Cruger, Springfield, Pa.;
Ronald J. Charno, Drexel Hill, Pa.

[73] Assignee: Gulf & Western Industrial Products Company, Grand Rapids, Mich.

[22] Filed: Jan. 11, 1971

[21] Appl. No.: 105,589

[52] U.S. Cl. ............................293/71 R, 293/85, 293/91
[51] Int. Cl. ...........................B60r 19/06, B60r 19/08
[58] Field of Search ..................293/71 R, 73, 85, 86, 91

[56] References Cited

UNITED STATES PATENTS

| | | | |
|---|---|---|---|
| 1,563,475 | 12/1925 | Prennan | 293/91 X |
| 1,564,488 | 12/1925 | Nastri | 293/86 |
| 1,881,231 | 10/1932 | Jackson | 293/71 R |
| 1,985,113 | 12/1934 | Smith | 293/71 R |
| 3,494,607 | 2/1970 | Rusch | 293/71 R |

Primary Examiner—James B. Marbert
Assistant Examiner—R. Saifer
Attorney—Meyer, Tilberry & Body

[57] ABSTRACT

A shock absorbing bumper comprising an impact distribution plate, a core of shock absorbing material, and a backing plate. The impact distribution plate may be made of steel or a rigid plastic and may be on the outer surface of the shock absorbing material or imbedded therein. The shock absorbing core consists of a foamed plastic material such as a polyurethane cellular foam and preferably consists of a high density, tight cell polyurethane foam. Connector pins attach the impact distribution plate slidably into the backing plate so that the impact plate is supported by the backing plate against forces applied substantially parallel to the impact plate but will not directly transmit to the backing plate impact forces applied substantially perpendicularly to the impact plate. The bumper may be mounted with shock absorbing springs which deflect upon impact. The bumper may be formed with a projecting leading edge. Apertures may be provided in the backing plate to permit the escape of compressed gas from the foam.

26 Claims, 8 Drawing Figures

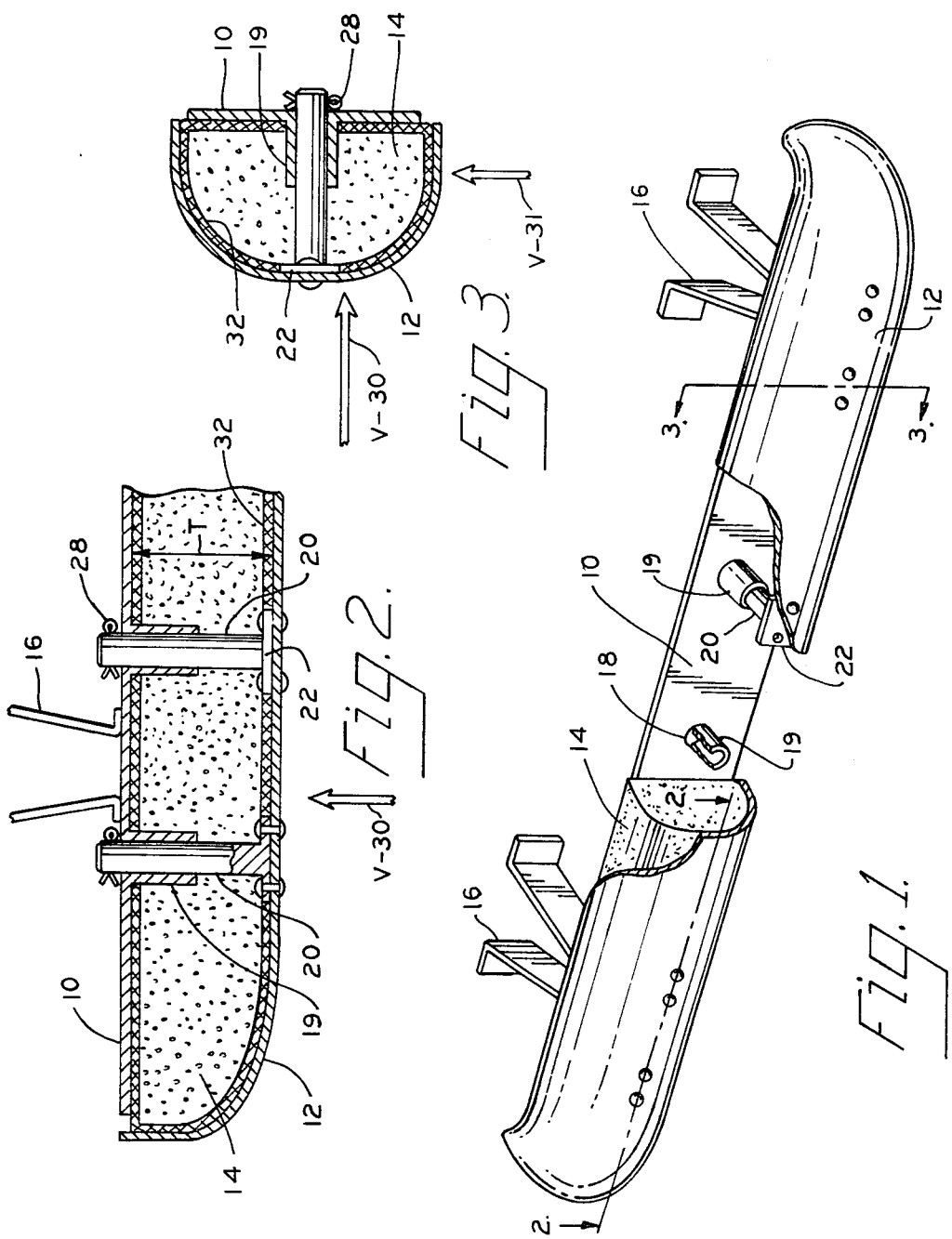

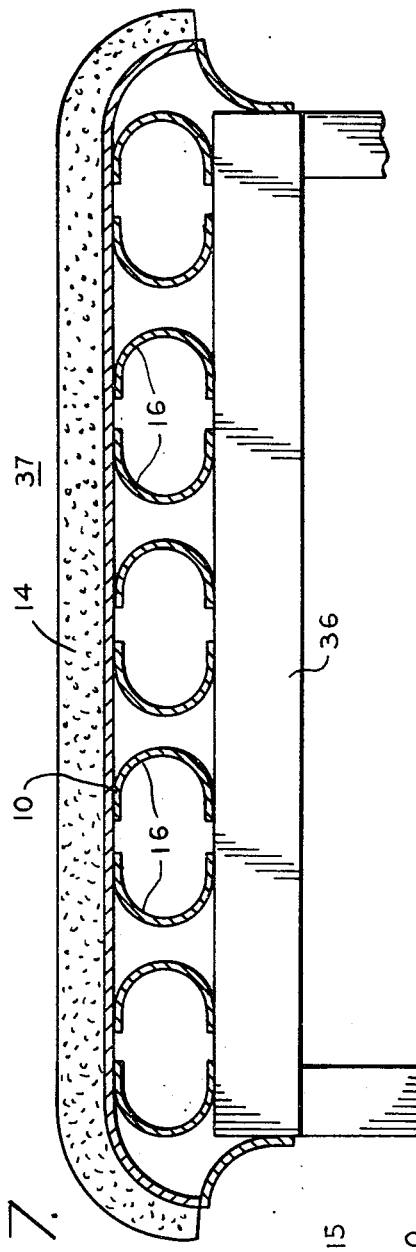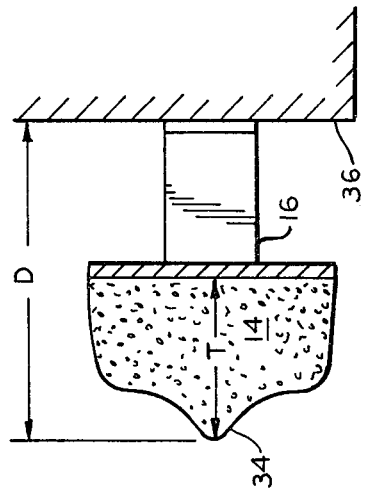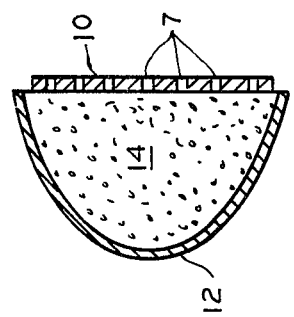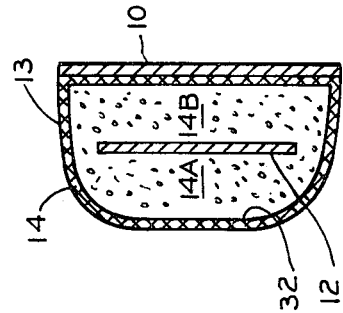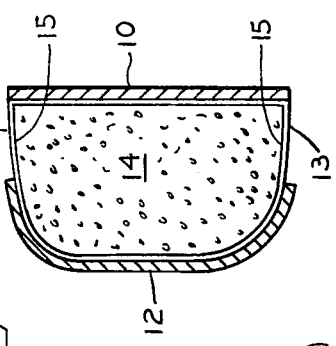

SHOCK ABSORBING BUMPER

This invention pertains to the art of shock absorbing bumpers in general and more particularly to shock absorbing bumpers for vehicles.

The invention is particularly applicable to shock absorbing bumpers for automobiles and will largely be described with reference thereto although it will be appreciated that the invention has broader applications such as serving as a shock absorbing bumper for all manner of vehicles and vessels as well as for buildings, structures, docks and machines and, in general, as a protective, shock absorbing device.

For many years automobile bumpers consisted merely of rigid metal bars or beams affixed to the chassis of the automobile by a metal strap or connector. The purpose of such bumpers was mainly to prevent structural damage to the sheet metal fenders and grill of the automobile, and served to reduce only very little, if at all, the impact shock transmitted to the chassis of the vehicle and its occupants.

In attempting to develop an automobile bumper particularly suited to automobiles which would absorb more than a negligible portion of the impact of a collision, it has become known in the art to provide an automobile or other vehicle bumper which contains a resilient or shock absorbing pad affixed to a backing plate whereby a portion of the energy of impact is absorbed in deforming the resilient pad.

Accordingly, bumpers made out of shock absorbing material such as a foamed polyurethane plastic affixed to a backing plate are well known in the art. It is also known to provide such padded bumpers with an outer skin or layer of elastomeric or other suitable material which will serve both to protect the foamed plastic or other resilient material from the elements and to provide a reasonably attractive surface for the bumper. Such padded bumpers have several disadvantages, however. For one, the impact force in a collision is normally localized at a given point on the bumper and the resultant localized compression of the padding at the point of impact transmits a substantial portion of the impact energy through the compressed padding to the back plate thence to the automobile or other vehicle chassis. The excessive localized compression also tends to rupture and tear the surface of the padding.

Further, such padded bumpers generally have poor vertical strength. That is to say, they have a tendency to pull loose from the rigid backing plate if a vertical load is imposed thereon, as by someone standing on the bumper or as by a jack or other means being applied to the bumper to raise the vehicle. The thicker the padding, the greater is the problem of a lack of vertical strength in the padded bumper. This results in another shortcoming of the prior art in that the thickness of the padding tends to be insufficient to absorb sufficient collision energy. Accordingly, the known padded bumpers do not offer a substantial improvement over earlier, unpadded bumpers.

The present invention accordingly contemplates a shock absorbing padded bumper which is thick, yet has good resistance to vertical loading and which is capable of absorbing substantial amounts of impact energy and distributing such energy across substantially the entire bumper so that the entire shock absorbing core absorbs shock, thereby substantially reducing the amount of energy transmitted to the backing plate and thence to the vehicle chassis.

In accordance with the present invention, there is provided a shock absorbing bumper comprising a foamed plastic or other shock absorbing material core to absorb the impact energy of a collision, and an impact-distributing plate disposed over substantially the entire impact-receiving area of the shock absorbing core. The shock absorbing core is affixed to a backing plate which in turn is affixed to the vehicle chassis or other structure, there being no rigid connection between the impact-distributing layer and the rigid backing plate.

While any suitable material may serve as the impact-distributing layer, a steel plate or a rigid (relative to the shock absorbing material) plastic plate is preferred. Polyester resin,glass fabric reinforced plastic, is also a preferred material for the impact distribution layer. In accordance with a limited aspect of the invention therefore, the impact distribution plate comprises a steel or reinforced polyester resin plate placed over the shock absorbing core.

While this arrangement provides good impact resistance and shock absorption for forces which are imposed on the bumper in a direction generally perpendicular to the impact distribution plate, i.e., to normal vehicle collision forces, a force imposed in a direction parallel to the plate, as would be imposed by someone standing on an automobile bumper or by a bumper jack being employed to raise the vehicle, would tend to pull the shock absorbing material away from the backing plate. This could be overcome by rigidly connecting the shock absorbing core to the backing plate, such as by connecting pins. However, such connectors would transmit collision forces from the impact distributing plate directly to the backing plate. In accordance with one aspect of the invention therefore, there are provided connector pins rigidly attached to the impact distribution plate and slidably connected to the backing plate through sleeves so that the connectors will transmit forces which are imposed substantially parallel to the impact distribution plate to the backing plate, but will not transmit forces imposed substantially perpendicularly thereto, since such forces will merely cause the pins to slide through sleeve openings.

With the impact distribution layer on the outside of the shock absorbing core, it was found to be subject to denting upon impact, and liable to inflict dents and scratches on the objects with which it collided. A thin layer of a foamed plastic or other shock absorbing material placed over the impact plate was found to be advantageous in overcoming such denting by virtue of its greater shock absorbing capacity. Further, a foamed plastic material tends to "heal" any cuts sustained, by its ability to close so that small tears are not readily visible. In accordance with another aspect of the invention therefore, the impact-distributing plate is sandwiched between two layers of shock absorbing material, a relatively thin outer layer and a relatively thick inner layer. It will be appreciated that in other aspects of the invention, an impact-distributing layer may be on the outside of the shock absorbing core in combination with a second imbedded layer.

The shock absorbing capacity of a foamed plastic padded bumper depends, of course, on the type of foamed plastic material used, i.e., its shock absorbing capacity per unit depth, and the thickness of padding employed. Since practical considerations of design limit the amount of padding which can be employed, there is provided in accordance with another aspect of the invention, a shock absorbing core for a bumper comprising a foamed plastic pad in combination with shock absorbing springs so that the total shock absorbing capacity per unit depth of padding is increased.

Only a part of the shock absorbing ability of a foamed plastic such as polyurethane foam is due to the elasticity of the material itself. The remainder is due to the compression of air contained within the hollow cells dispersed throughout the foam, and the flow of this compressed air through the foam. The compressed air escapes from the cells through small openings (which may be referred to as "windows") in the cell wall. A foamed plastic material may consist of closed cells, i.e., cells without windows, or open cells, i.e., cells with windows. In a closed cell foam, the air contained within the cells is compressed by the impact force and expands when the pressure is removed. The work done by compression of the gas absorbs a portion of the impact energy. Likewise, forcing the air through the windows of open cells and through the interstices in the foam absorbs impact energy input. It has been found that high energy absorption by a foamed plastic material is attained by employing a high density polyurethane foamed plastic which has both open and closed cells, but with small diameter open cell windows. Such a foamed plastic may be referred to as a "tight" cell foamed plastic. Therefore, in accordance with one aspect of the invention, the shock absorbing core comprises a high density, tight cell polyurethane cellular foam plastic.

It has also been found that the provision of an integral, high density outer layer on the shock absorbing core material helps to distribute the impact forces throughout the core by exerting a pulling effect on the underlying core material. Provision of an integral high density outer layer may be accomplished in the case of a foamed plastic material by forming the foam under vacuum so that its outer layer is of higher density than the interior of the foamed plastic.

Therefore, in accordance with yet another aspect of the invention, the shock absorbing core itself may be provided with an integral, dense phase surface.

It is an object of the present invention to provide a shock absorbing bumper with outstanding impact load distribution and absorption characteristics.

It is another object of the invention to provide a shock absorbing bumper of improved design which has good strength in resistance to vertically imposed forces in addition to having outstanding impact load absorption characteristics.

It is another object of the invention to provide a shock absorbing bumper which employs high density, tight cell polyurethane foam as a shock absorbing material.

Other objects and advantages of the invention will become apparent from the following detailed description of specific embodiments thereof which are for the purpose of illustrating but not of limiting the invention.

The invention may take physical form in certain parts and arrangement of parts, specific embodiments of which are shown in the attached drawings which form a part hereof and wherein FIG. 1 represents in perspective, partial section view a specific embodiment of the present invention.

FIG. 2 represents a sectional view of a longitudinal section taken along line 2—2 of FIG. 1.

FIG. 3 represents a sectional view of a vertical section taken along dotted line 3—3 of FIG. 1.

FIG. 4 is a vertical section view of a second embodiment of the invention.

FIG. 5 is a vertical section view of a third embodiment of the invention.

FIG. 6 is a vertical section view of a fourth embodiment of the invention (the views of FIGS. 3, 4, 5 and 6 are analogous to each other).

FIG. 7 is a plan view of a fifth embodiment of the invention.

FIG. 8 is a vertical section view (analogous to the views of FIGS. 3-6) showing a sixth embodiment of the invention.

Referring now to FIG. 1, a backing plate 10 and a load distribution plate 12 contain a shock absorbing core 14 which may be made of any suitable shock absorbing material. Cellular polyurethane foam is a preferred material of the shock absorbing core since it possesses good shock absorbing characteristics and may be conveniently formed as described hereinbelow.

A preferred material of the invention is a polyurethane cellular foam containing both open and closed cells. Foamed plastics in general and polyurethane foam in particular, contain air or gas-filled cells distributed throughout the plastic material. These cells are formed in place by introduction of either chemical or solvent type blowing agents, as is well known in the art, and will therefore not be described in detail here. As is well known, it is possible to control the foaming action so as to obtain either closed or open cells or a combination of the two within the foamed material. Closed cells are pockets of air (or other gas) formed within the plastic material without outlets for the gas from the cell. Upon compression the gas contained within the cells is compressed as the cell is deformed, and expands as the pressure is relieved and the cell returns to its original shape.

Open cells are cells which contain an opening or "window" leading from the cell wall to interstices within the plastic material itself. Upon compression of the material the cell is distorted and the air or gas contained within the cell is compressed and escapes through the window into interstices within the foam material. Impact energy is thus absorbed both by compression of gas trapped within the closed cell and by the compression and expulsion from the foam of gas contained within the open cells. The combination of spring-type action provided by the closed cells and air expulsion action through the small interstices of the foam provided by the open cells, has been found to be highly advantageous with respect to the shock absorbing characteristics of the foamed material.

A high density polyurethane foam plastic, i.e., a foamed polyurethane with a material density of over 7 lbs. per cubic foot (preferably between about 10 and about 20 lbs. per cubic foot) has been found to be an outstanding shock absorbing material for use in the shock absorbing bumpers of the invention. A "tight" foam with between about 90 and about 99 percent of the cells being of the open type and the remainder being of the closed type has been found to be particularly advantageous because the high rate of air flow through the restricted openings in the foam provides a built-in shock absorber effect. It has been found that with a right foam, the faster the rate of loading, the more resistance there is to the expulsion of air from the foam, and the greater is the shock absorbing capacity of the material. This provides a material particularly well suited for use as a shock absorbing material for bumpers since the impact of a collision represents, of course, an extremely high rate of loading. It is to be understood that the high density, tight cellular foam is preferred for use with any and all embodiments of the invention.

Returning now to FIG. 1, mounting brackets 16, which may comprise metal strip supports, spring leafs or any other suitable means, mount the bumper to the chassis of the automobile or other structure which it is designed to protect. Backing plate 10 is provided with apertures 18 at suitable intervals as best shown in the broken-away portion of FIG. 1. Each aperture 18 has a guide sleeve 19, the function of which is described hereinbelow.

Load distributing plate 12 is provided with pin connectors 20 as best seen in FIGS. 2 and 3. Pin connectors 20 are suitably provided with a bearing plate or enlarged portion 22 to provide a bearing surface area against the back portion of load distribution plate 12. Pin connectors 20 may be connected at enlarged portions 22 to load distribution plate 12 by any suitable means such as welding, bolting, riveting or the like. Pin connector 20 is shown in the drawings as riveted to load distribution plate 12, for purposes of illustration only.

The relationship between the various components of the bumper is well illustrated in FIGS. 2 and 3 which represent respectively, a horizontal section view taken along dotted line 2—2 and a vertical section view taken along dotted line 3—3 of FIG. 1. Impact distribution plate 12 serves to receive the impact force of a collision represented by vector arrow V–30 in FIGS. 2 and 3. It is to be noted that there is no rigid connection between impact distribution plate 12 and backing plate 10, hence there is no direct transmission of impact energy between load distribution plate 12 and the vehicle or other structure which is protected by the bumper of the invention, other than that which is transmitted through shock absorbing material 14. Upon collision, the force of impact, by reason of impact distribution plate 12, is distributed over substantially the entire length of the bumper. This precludes local compression of shock absorbing core 14 with consequent transmission of substantial shock energy to the backing plate 10 and thence to the protected structure.

As stated above, shock absorbing material 14 may be of any desired and suitable shock absorbing material. It is preferred to employ a high density, tight cell polyurethane foam and most preferably, a high density foam of between about 10 and about 20 lbs. per cubic foot density with between about 90 to about 99 percent of the total number of cells being of the small diameter–window open type and the remainder being of the closed type. While any suitable thickness of shock absorbing material may be utilized, it is preferred that the thickness of the shock absorbing core (dimension T in FIG. 2) be at least 2 inches.

Pins 20 are seen to provide vertical support for the bumper i.e., to provide rigidity in the case of forces applied from above or below as by someone standing on the bumper or as by use of a bumper jack being used to raise the vehicle by a force (represented as vector arrow V-31 in FIG. 3) imposed on the bumper. Sleeve 19 is seen to extend along a portion of pin 20 so that a holding force is maintained which will maintain load distribution plate 12 in alignment with backing plate 10 and not impose a force on shock absorber core 14 which would tend to twist it away from backing plate 10. However, in a case of collision, with a force of impact (as best shown in FIG. 3) being sustained by impact distribution plate 12 in the direction of vector arrow V-30, as shock absorber material 14 is compressed and plate 12 advanced towards backing plate 10, pin 20 will slide through sleeve 19 and the only transmission of force between impact distribution plate 12 and backing plate 10 is through shock absorbing core 14. Cotter pin 28 prevents pin 20 from moving too far forward in sleeve 19.

Thus, the load distribution property of impact distribution plate 12, in conjunction with the elimination of any rigid connection between plate 12 and backing plate 10 provides for distribution of the energy of impact throughout substantially the entire length of said bumper.

In order to enhance the impact distribution characteristics of the bumper, shock absorber core 14 may be provided with an outer skin layer of increased density. An integral high density skin may be formed over shock absorber core 14 by methods well known in the art. The high density skin is represented in FIG. 3 by the cross-hatched portion 32. The high density skin may be used in conjunction with impact distribution plate 12, thereby enhancing the overall load distribution characteristics of the bumper.

While the embodiment shown in FIGS. 1 to 3 has a generally U-shaped impact plate 12, this is merely one embodiment of the invention and impact plate 12 may in other embodiments be flat or have only partial encirclement of shock absorbing core 14. This is shown with reference to FIG. 4 which shows a section view, analogous to that of FIG. 3, of another embodiment of a bumper made in accordance with the invention wherein impact distribution plate 12 is seen to be of a more open configuration. Shock absorbent core 14 thus has an exposed upper and lower portion generally designated as 15 in the drawing. Backing plate 10 and pin connectors 20 (not shown in FIG. 4) may be generally the same as shown with respect to the embodiment of FIGS. 1 through 3. In this embodiment, it is preferable that shock absorbing core 14 be provided with a tough outer skin 13 to protect the exposed portions 15 of the core material from the weather and from abrasion. Although it is possible to provide such a skin over only the exposed portions it will generally be more convenient from a manufacturing point of view to provide the entire shock absorbing core 14 with the tough skin.

Outer skin 13 may comprise any suitable resilient or elastomeric material which is capable of protecting the core material from abrasion and from the elements. The outer skin may be formed or applied over the shock absorbing core material by any suitable means. Alternatively, outer skin 13 may simply consist of the high density integral foam layer described with reference to the embodiment of FIG. 3. Outer skin 13 may also comprise a resilient or elastomeric coating or covering applied over the high density integral foam layer 32.

One method of providing the resilient or elastomeric coating will be described in connection with description of a method of manufacturing the bumper of the invention as discussed hereinbelow.

In some configurations, it is advantageous to provide an outer layer of shock absorbing material over impact distribution plate 12. Referring now to FIG. 5, which represents a cross sectional view analogous to that of FIG. 4, it is seen that impact distribution plate 12 is imbedded within the core 14 of the bumper. It is particularly advantageous in this embodiment to provide shock absorber core 14 with a high density, integral outer skin 32. Alternatively, or in addition, a second impact distribution plate (not shown) may be provided over the outside of the bumper. An elastomeric skin coating 13 may be provided to provide the finished bumper with a pleasing appearance. In this embodiment shock absorbing core 14 comprises a first section 14A overlying impact distribution plate 12 and a second section 14B between impact distribution plate 12 and backing plate 10.

FIG. 6 represents a vertical cross sectional view analogous to that of FIGS. 4 and 5 and shows an embodiment of the invention wherein a projecting leading edge 34 is formed into the bumper so that the distance (dimension D in FIG. 6) between the point of impact with the bumper and the vehicle or structure 36 to be protected is increased. The maximum thickness of the shock absorbing material (dimension T in FIG. 6) is also increased by this configuration.

FIG. 7 is a plan view of a bumper generally represented at 37, with a shock absorbing pad 14 and a backing plate 10. The bumper is connected to the vehicle or structure 36 by means of compressible C-springs 16. Upon impact, a portion of the energy of impact is taken up by shock absorbing core 14 and another portion is taken up by C-springs 16 which, as they deflect, absorb a portion of the energy of impact. In this embodiment, the backing plate 10 is deflected towards vehicle or structure 36, upon a collision of sufficient force. This energy absorption deflection permits a reduction of the required thickness of shock absorbing material 14 for a given shock absorption rating of the bumper.

It should be noted that if required, features of the various embodiments shown may be combined, i.e., the controlled deflection of backing plate 10 (FIG. 7) may be combined with the imbedded impact distribution plate of FIG. 5. The ports 17 in the backing plate of FIG. 8 may be used in any of the other embodiments, etc.

Referring to FIG. 8, shock absorbing core 14 comprises a foamed polyurethane containing open cells with small diameter windows or orifices, and closed cells. Upon impact, core 14 is compressed and absorbs the energy of impact partly by the elastic compression of the material, partly by the compression of air contained within the closed cells and partly by compression and leakage of air from the open cells through the restricted diameter windows and interstices of shock absorbing core 14. The work done in forcing the compressed air through the restricted passageways of the foamed plastic absorbs a substantial portion of the impact energy. Ports 17 are shown provided in backing plate 10 to permit the escape of the compressed air leaked through the foam, but may be located at any convenient place.

It has surprisingly been found that the high resistance to air flow through a tight foam provides a substantial increase in the energy absorption characteristics of the bumper. By venting the bumper with ports 17 so that the compressed, leaked air may escape to atmosphere, both the compression of air in closed cells and the orifice effect of leaked air passing through the restricted passageways from the open cells are employed to absorb the kinetic energy of the collision.

One method of manufacturing a shock absorbing bumper in accordance with the invention may be described as follows:

The shock absorbing core of the invention may conveniently be formed in a mold cavity which is adapted to receive impact distribution plate 12 in a face down position with pins 20 and backing plate 10 attached thereto. Foam material is injected into the mold and set and cured by known methods. The cured and set bumper is removed, finish cured, and excess foam which may have escaped through portions of the mold is trimmed away.

In the case of a bumper in accordance with the embodiment shown in FIG. 4, the mold side walls may be sprayed with a completely cured polyurethane or other plastic in one or several coatings to form an elastomeric skin 13 over the exposed portion 15 of the shock absorbing core. Alternatively, an outer skin insert may be placed into the mold.

As hereinabove stated, the shock absorbing core may be formed in such a manner that a dense, integral outer skin is formed thereon.

A bumper constructed in accordance with the invention has outstanding shock absorption characteristics, and will absorb significant proportions of the energy of collisions, thereby providing an efficient, safety enhancing bumper particularly suited for automobiles and trucks.

The invention has been described in detail with reference to specific embodiments thereof, but it will become apparent to those skilled in the art, upon the reading and understanding of the foregoing specification, that numerous modifications and alterations to the embodiments disclosed may be made which modifications and alterations fall within the spirit and scope of the invention. It is intended to include all such modifications and alterations within the scope of the appended claims or the equivalents thereof.

What is claimed is:

1. A shock absorbing bumper comprising a backing plate fastened to the structure or vehicle to be protected,
   an impact distribution plate slidably engaged with said backing plate so that a force imposed upon said impact distribution plate tends to advance said impact distribution plate towards said backing plate,
   a core of shock absorbing material substantially coextensive with and interposed between said impact distribution plate and said backing plate so that movement of said impact distribution plate towards said backing plate tends to compress said shock absorbing core therebetween.

2. The shock absorbent bumper of claim 1 wherein the connection between said impact distribution plate and said backing plate comprises connector pins rigidly attached to said impact distribution plate, and slidably engaged by sleeved apertures in said backing plate.

3. The shock absorbing bumper of claim 1 wherein said shock absorbing material is a foamed plastic material.

4. The shock absorbing bumper of claim 3 wherein said shock absorbing material is a high density tight cell polyurethane foamed plastic.

5. The shock absorbing bumper of claim 4 wherein said high density, tight cell shock absorbing material has an overall material density of between about 10 and about 20 lbs. per cubic foot, and which has between about 90 and about 99 percent open cells and about 10 and about 1 percent closed cells.

6. The shock absorbing bumper of claim 1 wherein said impact distribution plate is made of steel.

7. The shock absorbing bumper of claim 1 wherein said impact distribution plate is made of plastic.

8. The shock absorbing bumper of claim 1 further including shock absorbing springs connecting said backing plate to the structure or vehicle to be protected.

9. The shock absorbing bumper of claim 8 wherein said shock absorbing springs are C-shaped springs.

10. The shock absorbing bumper of claim 1 wherein said impact distribution plate is imbedded within said shock absorbing core material.

11. The shock absorbing bumper of claim 1 further including a projecting leading edge.

12. The shock absorbing bumper of claim 10 wherein the thickness of the shock absorbing material overlaying said impact distribution plate is less than the thickness of shock absorbing material contained between said impact distribution plate and said backing plate.

13. The shock absorbing bumper of claim 1 wherein the thickness of said shock absorbing core is at least 2 inches.

14. A shock absorbing bumper comprising a polyurethane foam shock absorbing core, an impact distribution plate structurally associated with said shock absorbing core to distribute impact forces over substantially the entire area of said shock absorbing core, means connecting said impact distribution plate in slidable engagement with the structure or vehicle to be protected so that impact forces imposed upon said impact distribution plate tend to compress said shock absorbing core between said impact distribution plate and the structure to be protected.

15. The shock absorbing bumper of claim 14 wherein said bumper is attached to the structure or vehicle to be protected by means of a backing plate provided with sleeved apertures to receive the slidable engaging means of said impact distribution plate.

16. The shock absorbing bumper of claim 15 wherein said backing plate is connected to said structure or vehicle by means of shock absorbing springs.

17. The shock absorbing bumper of claim 14 wherein said shock absorbing material comprises a high density tight cell polyurethane foam.

18. A shock absorbing bumper for motor vehicles including automobiles, comprising an impact distribution plate mounted in slidable engagement with a backing plate, a core of shock absorbing material substantially coextensive with and located between said impact distribution plate and said backing plate, and means to connect said backing plate to said vehicle chassis.

19. The vehicle bumper of claim 18 wherein said impact distribution plate is mounted in slidable engagement by means comprising pins rigidly connected to said impact distribution plate and received in sleeved apertures in said backing plate.

20. The bumper of claim 18 wherein said shock absorbing material comprises a high density, tight cell polyurethane foam.

21. The shock absorbing bumper of claim 18 wherein said high density, tight cell polyurethane foam has an overall material density of between about 10 and about 20 lbs. per cubic foot and has between about 90 and about 99 percent open cells and between about 1 and about 10 percent closed cells.

22. The bumper of claim 18 wherein said means to connect said backing plate to said vehicle chassis comprises shock absorbing springs.

23. The bumper of claim 22 wherein said shock absorbing springs are C-shaped springs.

24. The bumper of claim 1 wherein ports are provided to vent gas leaked from said shock absorbing material.

25. The bumper of claim 24 wherein said ports are located in said backing plate.

26. The bumper of claim 18 wherein ports are provided to vent gas leaked from said shock absorbing material.

* * * * *